United States Patent

Schoenfelder et al.

[11] Patent Number: 5,862,791
[45] Date of Patent: Jan. 26, 1999

[54] PROCESS AND DEVICE FOR CONTROLLING AN INTERNAL COMBUSTION ENGINE

[75] Inventors: Dietbert Schoenfelder, Gerlingen; Kai-Lars Barbehoen, Ludwigsburg, both of Germany

[73] Assignee: Robert Bosch GmbH, Stuttgart, Germany

[21] Appl. No.: 864,831

[22] Filed: May 29, 1997

[30] Foreign Application Priority Data

May 29, 1996 [DE] Germany .................. 196 21 537.7
Mar. 21, 1997 [DE] Germany .................. 197 11 787.2

[51] Int. Cl.⁶ ..................................... F02D 31/00
[52] U.S. Cl. ........................... 123/357; 123/501
[58] Field of Search ................... 123/357, 350, 123/396, 399, 500–502

[56] References Cited

U.S. PATENT DOCUMENTS

| | | | |
|---|---|---|---|
| 4,638,782 | 1/1987 | Yasuhara et al. | 123/502 |
| 5,043,647 | 8/1991 | Flaig et al. | 123/352 |
| 5,381,775 | 1/1995 | Birk et al. | 123/679 |
| 5,638,789 | 6/1997 | Hayner | 123/357 |
| 5,781,875 | 7/1998 | Maki et al. | 123/480 |

FOREIGN PATENT DOCUMENTS 34 00 711   7/1984   Germany .

*Primary Examiner*—Thomas N. Moulis
*Attorney, Agent, or Firm*—Kenyon & Kenyon

[57] ABSTRACT

A process and a device for controlling an internal combustion engine, in particular for influencing the time of fuel injection into an internal combustion engine, influences a system deviation, which is computed from a setpoint and an actual value. From the system deviation, a controller defines a manipulated variable to be supplied to the actuator. When a set of first operating states is present, a first controller structure is active, and when a set of second operating states is present, a second controller structure is active. At the time of passage from the first controller structure to the second controller structure, an initial value is set for the second controller structure as a function of at least the setpoint and the actual value.

10 Claims, 4 Drawing Sheets

PROCESS AND DEVICE FOR CONTROLLING AN INTERNAL COMBUSTION ENGINE

FIELD OF THE INVENTION

The present invention relates to a process and a device for controlling an internal combustion engine.

BACKGROUND INFORMATION

German Patent Application No. 34 00 711 (corresponding to U.S. Pat. No. 4,638,782) describes a process and a device for open and/or closed-loop control of an actuator, in particular for influencing fuel delivery in an internal combustion engine. A system deviation is determined from a setpoint and an actual value. From the system deviation, a controller defines a manipulated variable to be supplied to an actuator. At high engine speeds, control with this device is preferably performed using a controller with PI action. In other operating states (i.e., at low engine speeds) the actuator is only controlled using open-loop control.

In order for such controllers to satisfy the high requirements, in particular regarding dynamics, complex control circuit structures are needed. One possible way to meet those requirements is a use of variable-structure controllers which, under certain conditions, can be toggled between different controller structures. Thus, the controller may be able to, switch back and forth between a PI controller and a proportional (or a pure) open-circuit controller.

The switching action is problematic in the prior art. When switching from one controller structure to another controller structure, undesirable transient phenomena often occur. If a proportional control with a high gain used as a large-signal controller is switched to a PI controller used as a small-signal controller, I component must be suitably preset to avoid undesirable controller characteristics, i.e., oscillations.

SUMMARY OF THE INVENTION

The object of the present invention is to provide a process and a device capable of controlling an internal combustion engine, with which suitable control characteristics can be obtained in all operating states.

The process and device according to the present invention advantageously provide good control characteristics in all operating states. No oscillations occur during the transition between the separate controller structures.

DETAILED DESCRIPTION

Figure 1:
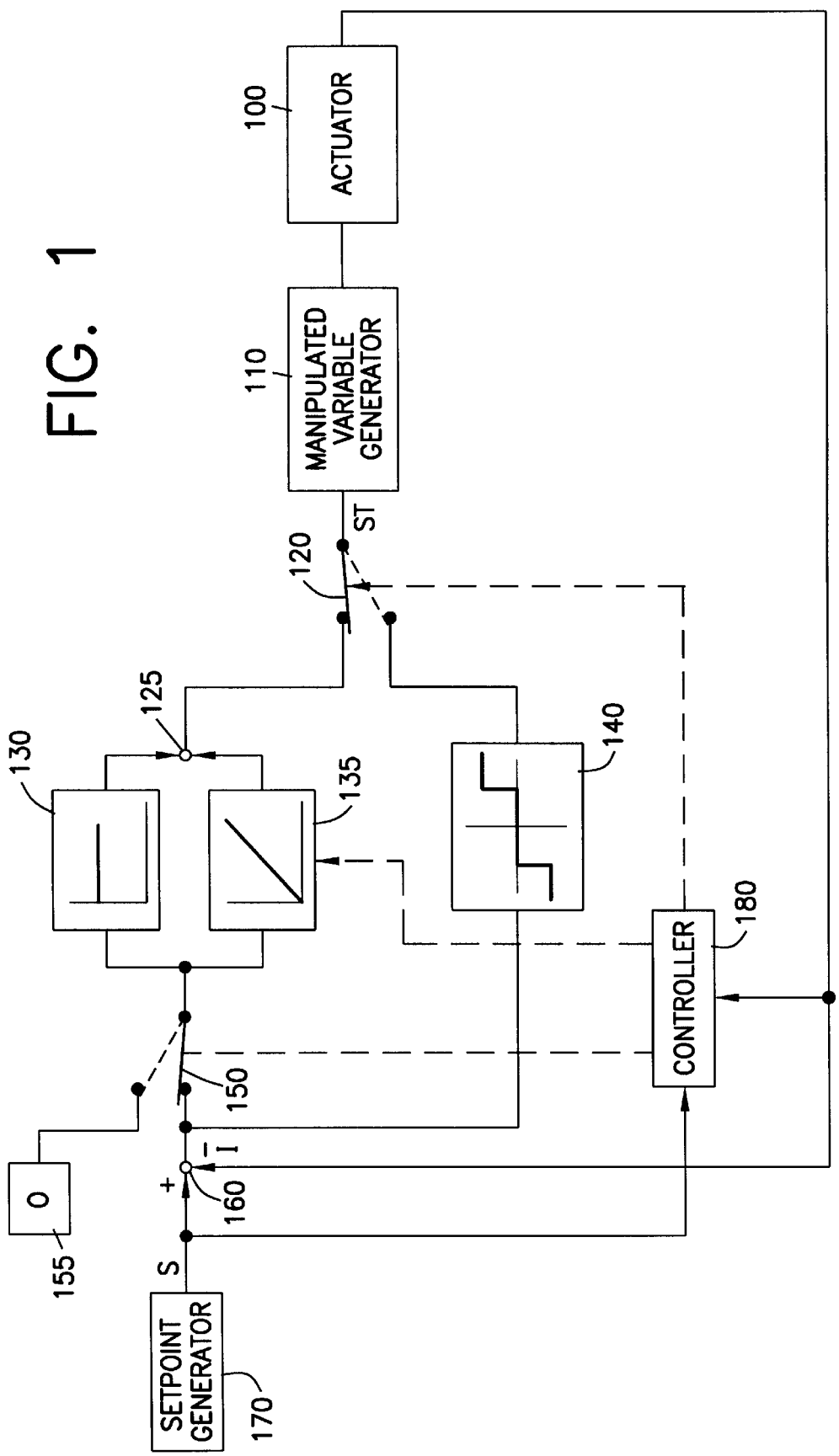
FIG. 1 shows a block diagram of the device according to the present invention.

FIG. 1 schematically illustrates the device according to the present invention, for example, controlling an injection timing mechanism of a self-igniting internal combustion engine. The process according to the present invention, however, is not limited to such control. It can also be used for controlling other parameters, and in particular parameters of internal combustion engines.

As shown in FIG. 1, the internal combustion engine (not shown) has fuel delivered to it by a fuel pump. An injection timing mechanism (or actuator) 100 can control the fuel delivery start or the fuel injection start.

Actuator 100 receives a signal from a manipulated variable generator 110. Depending on the control signal provided by manipulated variable generator 110, actuator 100 assumes a certain position, which results in a certain value being generated for the injection start or the delivery start.

Manipulated variable generator 110 receives output signal ST of a switching means 120. Switching means 120 selects either the output signal of a node 125 or the output signal of a large-signal controller 140 and forwards it to manipulated variable generator 110. Node 125 links the output signal of a P component 130 and an I component 135. P component 130 and I component 135 each receive the output signal of a switching means 150. P component 130 and I component 135 form a "PI controller," also referred to as a small-signal controller.

Switching means 150 forwards the output signal of a zero generator 155 or the output signal of node 160 to the PI controller. The output signal of node 160 then goes to large-signal controller 140.

Output signal S of a setpoint generator 170 with a positive sign and signal I with a negative sign are received at a node 160. Signal I is an actual value, while signal S is a setpoint of the control circuit.

A controller 180, which processes signal S, signal I and possibly other input values, is also provided. Controller 180 supplies control signals to switching means 150 and 120, and supplies a signal to I component 135.

Normally the switches are in the position indicated with a solid line. Thus, the device operates as a small-signal controller. Setpoint S is compared with actual value I in node 160. The system deviation thus formed is supplied to the controller consisting of P component 130 and I component 135. On the basis of this system deviation, P component 130 and I component 135 form one component each for the manipulated variable, which are combined in node 125. The manipulated variable ST thus formed is provided via switching means 120 to manipulated variable generator 110, which converts the output signal of the controller into a control signal to be supplied to actuator 100. Preferably, actuator 100 is supplied with a pulse duty factor that depends on the system deviation. As a result, the actuator assumes a certain position and starts injection at a certain point in time.

Either the position of actuator 100 or a signal for the delivery start and/or injection start can be used as actual signal I. Similarly, setpoint generator 170 must generate a corresponding setpoint S of the same magnitude. Setpoint generator 170 generates a setpoint S as a function of a plurality of operating parameters (not shown).

If large deviations occur (which is the case in particular when setpoint S changes substantially) the actuator needs a certain amount of time to reach the new setpoint. Large-signal controller 140 becomes active in the case of substantial system deviations. Depending on the system deviation, controller 180 actuates switching means 150 and 120 so that they assume the position indicated by the dashed line. This means that I component 135 and/or P component 130 receive a signal from a zero generator 155 so that they maintain their states. The system deviation is supplied to large-signal controller 140, whose output signal then goes to manipulated variable generator 110.

If the system deviation is larger than a certain value, a maximum value for the manipulated variable is generated. If the system deviation is less than a negative threshold value, a negative maximum value is generated. Large-signal controller 140 operates basically as a two-point controller. P component 130 and I component 135 operate in the range between the minimum and maximum values.

Passage from the large-signal controller 140 to P component 130 and I component 135, i.e., the passage from the dashed-line position to the solid-line position of switching means 150 and 120 is problematic. For this passage, the I component must be preset with a suitable initial value.

Figure 2:
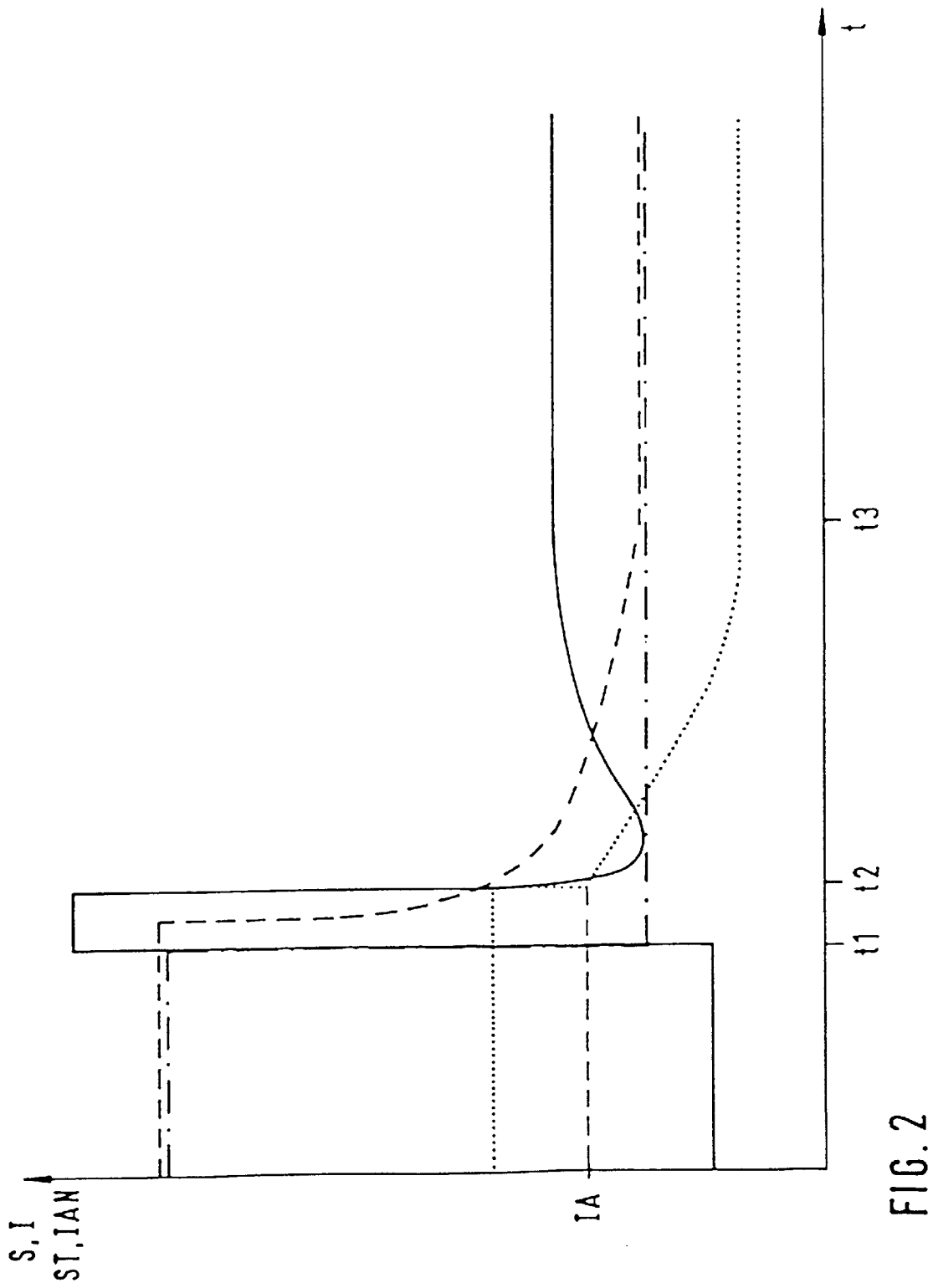
FIG. 2 shows a plurality of signals plotted against time.

FIG. 2 shows a plurality of signals, such as setpoint S, actual value I, manipulated variable ST, and I component IAN of controller 135 plotted against time t. Setpoint S is represented by a dot-and-dash line, actual value I is represented by a dashed line, manipulated variable ST, i.e., the input signal of manipulated variable generator 110, is represented by a solid line, and I component IAN is represented by a dotted line.

Up to time t1, all four signals have a constant value. Switching means 120 and 150 assume their position marked with a solid line. At time t1, setpoint S drops to a substantially lower value. Since actual value I still remains at its old value, this results in a very large system deviation. Control device 180 detects this, and controls switching means 150 and 120 so that they assume their position marked with a dashed line. This in turn results in large-signal controller 140 becoming active, which means that the control signal goes to a very high value.

The I component remains at its old value, because controller is no longer active. Between times t1 and t2, actual value I drops substantially due to the large manipulated variable ST. At time t2, actual value I attains a value such that the system deviation is less than the value at which large-signal controller 140 becomes active. This means that at time t2 controllers 130 and 135 are re-activated by switching means 120 and 150 being brought to their initial position.

At this time, the I component must be initialized with a suitable value. This means that the I component jumps to its new initial value at time t2.

Starting at time t2, actual value I drops further and approaches setpoint S. Manipulated variable ST drops substantially for a short time and approaches its new end value. The same thing applies to the I component. After time t3, all four values have attained their new end position.

Figure 3:
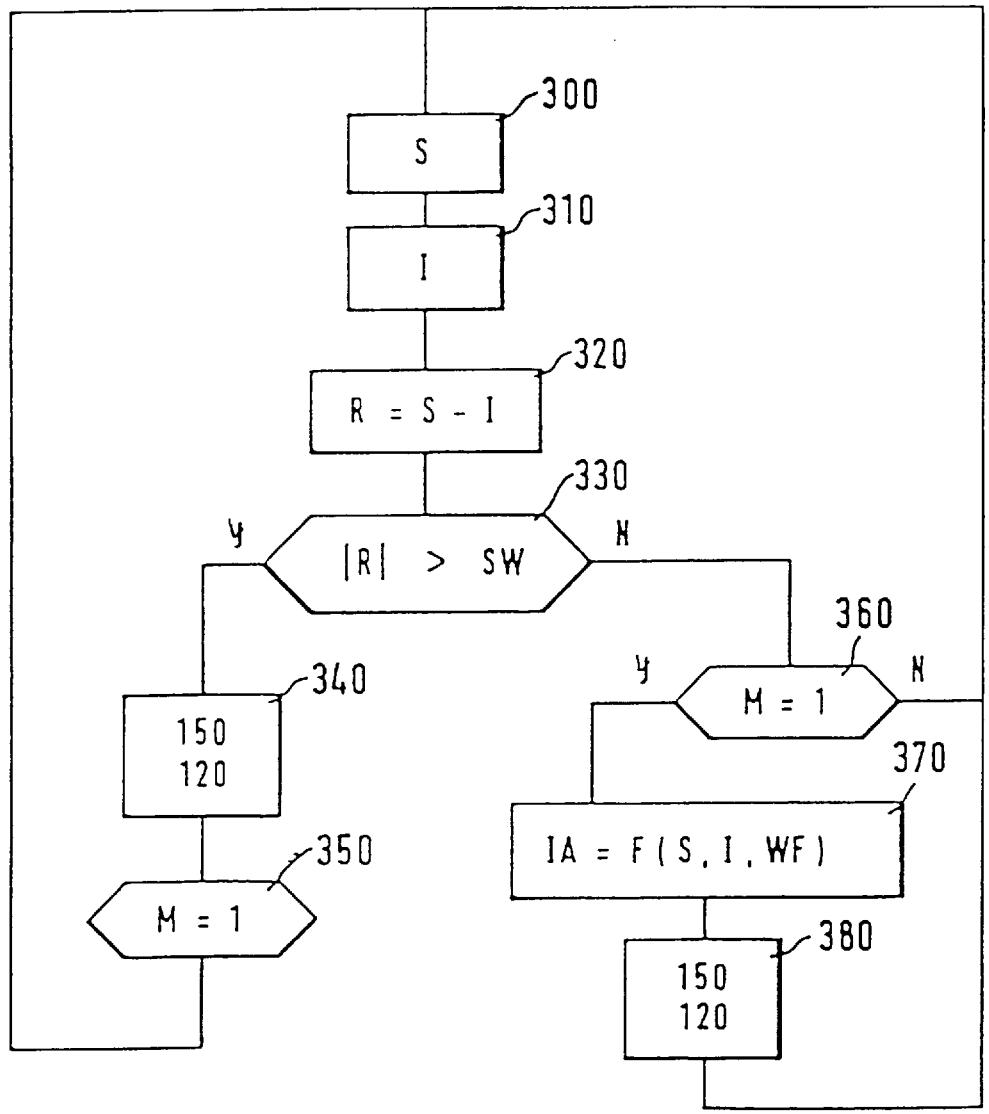
FIG. 3 shows a flow diagram according to a first embodiment of the process according to the present invention.
Figure 4:
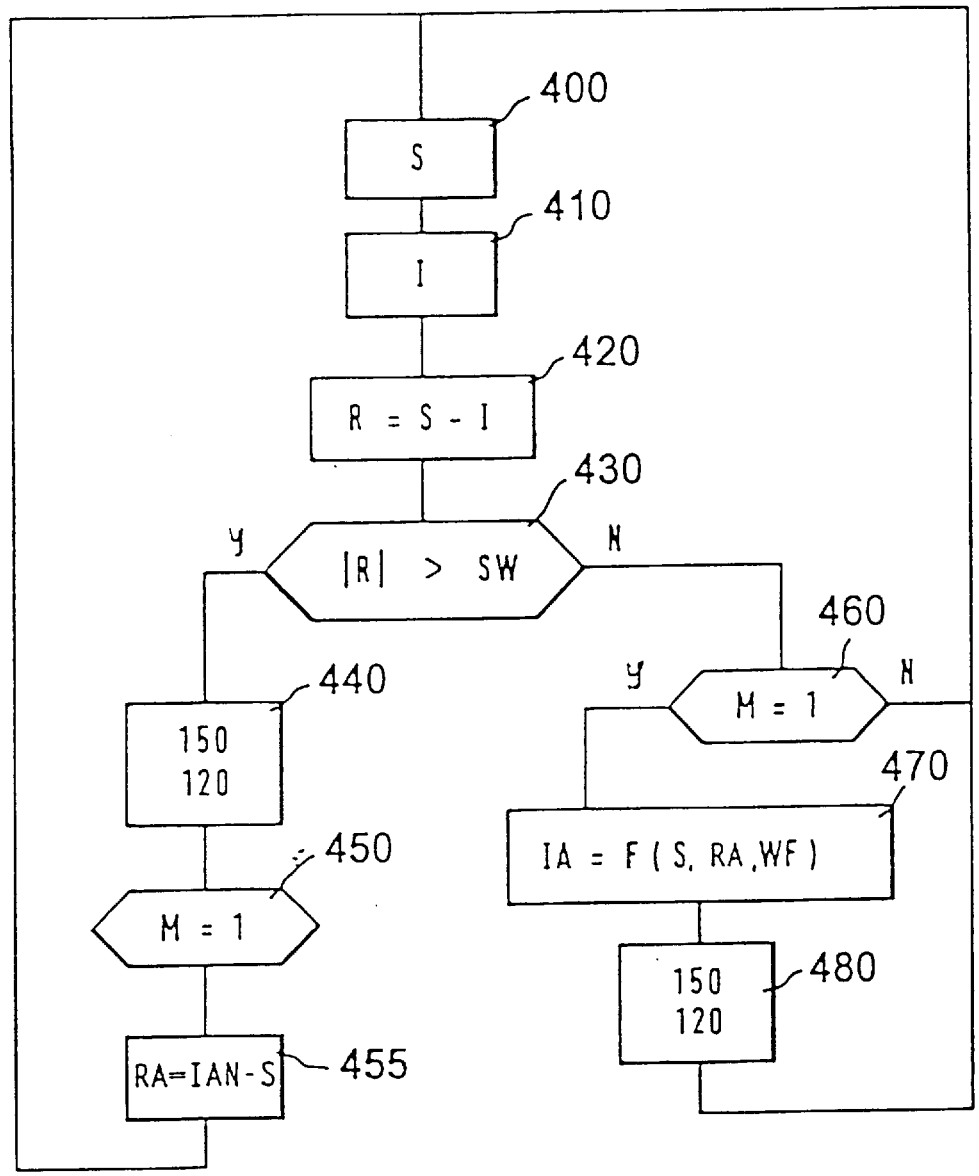
FIG. 4 shows a flow diagram according to a second embodiment of the process according to the present invention.

FIG. 3 shows the process according to the present invention using a flow chart. In a first step 300, the control detects setpoint S and in a step 310 it detects actual value I. In a step 320 it computes system deviation R from setpoint S and actual value I.

The subsequent query 330 checks whether the absolute value of the system deviation |R| is greater than a threshold SW. Threshold SW corresponds to the maximum possible control range. If this is the case, then a control signal is sent to switching means 120 and 150 in step 340, which causes them to assume their position marked with a dashed line. In this case, large-signal controller 140 becomes active if the absolute value of the system deviation is large. Subsequently, in step 350 a marker M is set to 1. Following step 350, the program is run again from step 300.

If query 330 provides the result that system deviation is not greater than threshold value SW, step 360 follows. In this step it is checked whether marker M is set to 1. If this is not the case, this means that controllers 130 and 135 were active in the previous program run, so the new run immediately follows starting with step 300. If marker M was set to 1, this means that large-signal controller 140 was active in the previous program run, so in step 370 an initial value IA is generated for the I component 135 as a function F of setpoint S, actual value I and a value WF.

Subsequently in step 380 a control signal is supplied to switching means 120 and 150, which causes them to assume their position marked with a solid line. In this case, if the absolute value of the system deviation is small, small-signal controller 130 and 135 is active.

The initial value for the I component IA results from the following formula:

$$IA=WF*S+(1-WF)*I$$

where WF is a first weighting factor. 1−WF is a second weighting factor. In another embodiment according to the present invention, a constant value, which is determined within the application and is permanently used in operation, is provided as weighting factor WF. In a further embodiment, the weighting factor is stored in a table as a function of a plurality of operating parameters. S is the current setpoint and I is the current actual value. The initial value IA for the I component IAN is computed from the current values of setpoint S and actual value I.

In yet further embodiment according to the present invention, weighting factor WF is provided as a function of setpoint S, actual value I, and threshold value SW. Threshold value SW corresponds to the system deviation at which switching from small-signal control to large-signal control occurs.

Thus, a weighted deviation WF (describing the degree of system deviation referred to the maximum range of actuation of the small-signal controller) is introduced. Depending on this weight, the I component is preset to a value dependent on setpoint S and actual value I. Thus, an optimum initial value is obtained for the integrator of the I component as a function of the current operating conditions. The choice of the weighting factor guarantees that entry into the new structure at the currently maximum system deviation results in the I component being preset with the maximum allowable control component, i.e., the greatest dynamics of the overall system. In addition, it is ensured that when the new structure is entered into with negligible system deviation, smooth activation of the manipulated variable is achieved. All intermediary states are continuously adjusted, thus satisfying the requirement of a smooth mode of operation.

Another embodiment of the invention is shown in FIG. 3 in the form of a flow chart. In a first step 400, the control detects setpoint S, and in a step 410 it detects actual value I. In a step 420 it computes the system deviation R from setpoint S and actual value I.

The subsequent query 430 checks whether the absolute value of the system deviation |R| is greater than a threshold value SW. If this is the case, a control signal is transmitted to switching means 120 and 150 in step 440, which causes them to assume their position marked with a dashed line. In this case, when the absolute value of the system deviation is large, large-signal controller 140 is active. In step 450, a marker M is set to 1. Subsequently in step 455, the difference between the I component and setpoint S is obtained and stored as value RA. After step 455, the program is run again starting with step 400.

If the result of query 430 is that the system deviation is not greater than threshold value SW, step 460 follows. In this step it is checked whether marker M is set to 1. If this is not the case, it means that in the previous program run controllers 130 and 135 were already active, so a new program run immediately follows with step 400. If marker M was set to 1, then large-signal controller 140 was active in the previous program run, so that in step 470, an initial value IA is set for the I component 135 as a function F of the current setpoint S and deviation RA of the I component IAN from setpoint S that was stored at the time of the passage from small-signal controller to large-signal controller.

Subsequently, in step 480, a control signal is transmitted to switching means 120 and 150, which causes them to assume their position marked with a solid line. In this case, if the absolute value of the system deviation is small, small-signal controller 130 and 135 is active.

The initial value for I component IA is obtained from the following formula:

$$IA=S+RA$$

According to the present invention, when switching from small-signal characteristics to large-signal characteristics, the difference between I component IAN and setpoint S is stored as value RA. When switching from the large-signal characteristics to the small-signal characteristics, the new initial value for I component IAN is computed from stored value RA and current setpoint S. This means that the initial value for initializing the small-signal controller can be set when switching from the large-signal controller to small-signal controller as a function of at least current setpoint S and the deviation of I component from setpoint S, stored when switching from the small-signal controller to the large-signal controller.

It is further advantageous if the initial value is computed according to the following formula:

$$IA=WF*S+(1-WF)*I+RA$$

Thus, the stored value RA is added to the initial value obtained by the process illustrated in FIG. 3.

What is claimed is:

1. A method for controlling a time of fuel injection into an internal combustion engine, comprising the steps of
    determining a system deviation as a function of a setpoint value and an actual value;
    defining a manipulated variable to be supplied to an actuator as a function of the system deviation using a system controller;
    activating a first controller structure using the system controller when a first operating state set is present;
    activating a second controller structure using the system controller when a second operating state set is present; and
    when the system controller deactivates the first controller structure and activates the second control structure, initializing the second controller structure with an initial value as a function of at least the setpoint value and the actual value.

2. The method according to claim 1, wherein the setpoint value includes a current setpoint value, and the actual value includes a current actual value, and wherein the second controller structure is initialized with the initial value as a function of at least the current setpoint value and the current actual value.

3. The method according to claim 1, wherein the setpoint value is weighted with a first weighting factor, and the actual value is weighted with a second weighting factor, and wherein the second controller structure is initialized with the initial value as a function of at least the weighted setpoint value and the weighted actual value.

4. The method according to claim 3, wherein the first and second weighting factors are a function of at least one of the system deviation and a maximum control range.

5. The method according to claim 1, wherein the first controller structure includes a large-signal controller, and wherein the second controller structure includes a small-signal controller.

6. The method according to claim 1, wherein the second controller structure includes at least one I component.

7. The method according to claim 6, wherein the setpoint value includes a current setpoint value, and wherein the initial value for initializing the second controller structure is a function of at least the current setpoint value and a deviation value of the I component from the setpoint value utilized when the system controller deactivates the first controller structure and activates the second control structure.

8. The method according to claim 3, wherein the initial value (IA) is calculated according to the formula:

$$IA=WF*S+(1-WF)*I,$$

wherein:

WF is the first weighting factor,

1−WF is the second weighting factor,

S is the setpoint value, and

I is the actual value.

9. The method according to claim 1, wherein the first operating state set is present when an absolute value of the system deviation is greater than a maximum control range value, and wherein the second operating state set is present when the absolute value of the system deviation is less than the maximum control range value.

10. A device for controlling a time to inject fuel into an internal combustion engine, comprising:
    means for determining a system deviation as a function of a setpoint value and an actual value;
    a system controller providing a manipulated variable to an actuator as a function of the system deviation;
    a first controller structure and a second controller structure;
    a switching arrangement activating the first controller structure when a first operating state set is present and activating the second controller structure when a second operating state set is present; and
    a controlling element setting an initial value for the second controller structure as a function of at least the setpoint value and the actual value when the switching arrangement deactivates the first controller structure and activates the second controller structure.

* * * * *